Patented Dec. 30, 1941

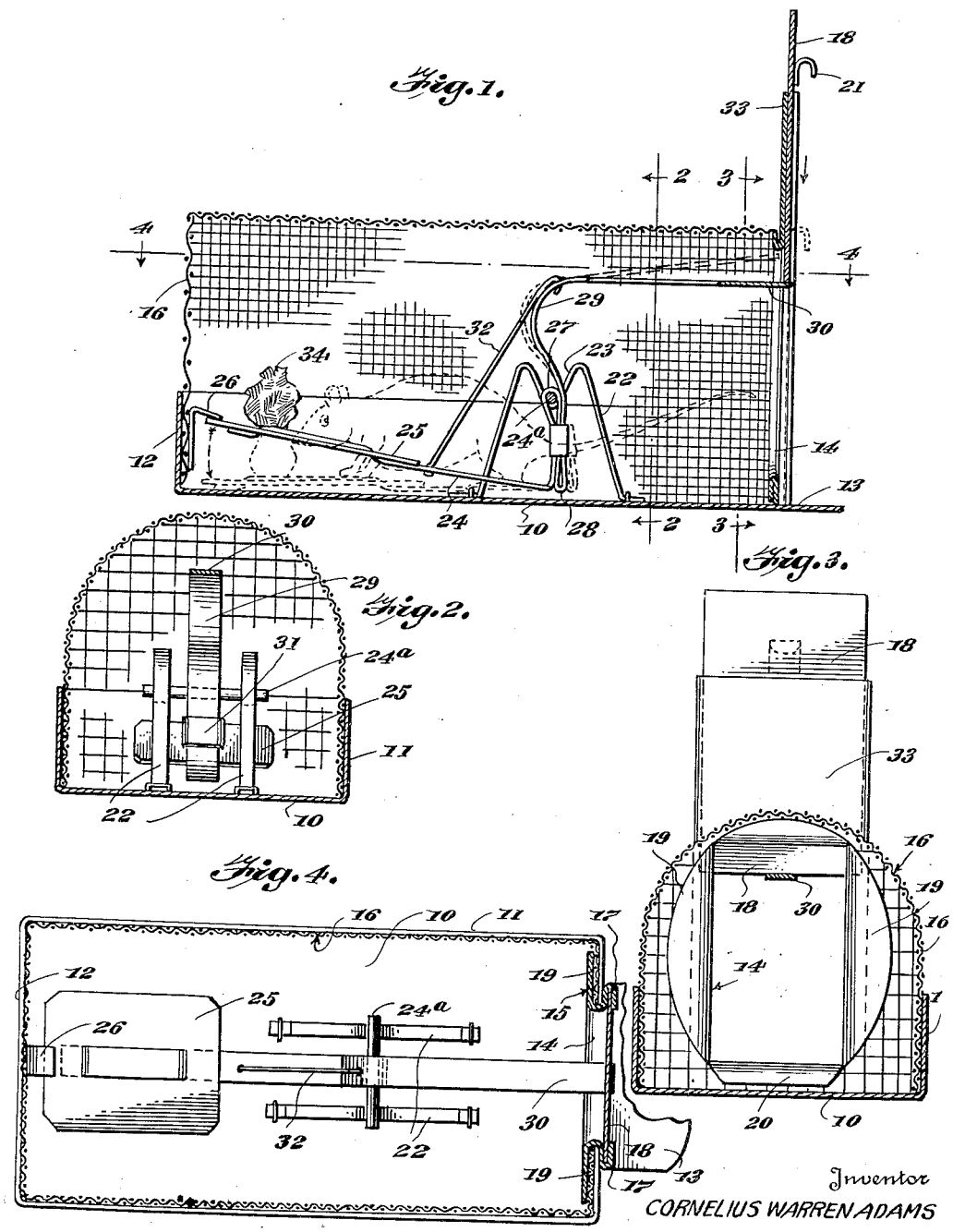

2,268,468

UNITED STATES PATENT OFFICE 2,268,468

ANIMAL TRAP

Cornelius Warren Adams, Biloxi, Miss.

Application January 27, 1941, Serial No. 376,206

2 Claims. (Cl. 43—61)

This invention relates to animal traps, and has for one of its objects the production of a simple and efficient trap having a specially constructed tripping platform so arranged and mounted as to be economical in construction and simple in operation.

A further object of this ivention is the production of a simple and efficient means for controlling the release of the closure gate of the trap, the tripping platform and the means for controlling the release of the door being constructed in a manner whereby said means may be efficiently supported in a swinging position to release the entrance door when an animal steps upon the treadle plate or tripping means.

Other objects and advantages of the present invention will appear throughout the following specification and claims.

In the drawing:

Figure 1 is a longitudinal sectional view of the trap;

Figure 2 is a vertical sectional view taken on line 2—2 of Figure 1;

Figure 3 is a vertical sectional view taken on line 3—3 of Figure 1, looking in the direction of the arrow;

Figure 4 is a horizontal sectional view taken on line 4—4 of Figure 1.

By referring to the drawing, it will be seen that 10 designates the base of the trap which is provided with upstanding side flanges 11 and an upstanding rear flange 12 to constitute a rigid bottom. The base or bottom 10 is provided with a forwardly extending lip 13 which extends in front of the door opening 14 formed in the front panel 15. A wire mesh dome-like cover 16 is carried by the base 10 and engages the front panel 15.

The front panel 15 is provided with a rolled track channel 17 in which is mounted a vertically sliding gate 18. The front panel 15 is provided with a pair of side flanges 19 and a bottom flange 20, the flanges 19 and 20 being bent backwardly to reinforce the side edges of the door opening 14 and to provide efficient means for holding the front panel in engagement with the wire mesh covering 16. The vertical sliding gate 18 is provided with a finger-engaging hook 21 near its upper end to facilitate the gripping of the gate to move the gate to an open position.

A pair of spaced cradle racks 22 are carried by the base 10 within the trap and these cradle racks 22 are provided with V-shaped sockets 23 in which the treadle supporting shaft 24ª is mounted. The racks 22 may be secured in any suitable or desired manner to the base 10. A treadle supporting member 24 carries at one end a treadle plate 25 which is adapted to be engaged by a stop bracket 26 to limit the upward swing of the treadle plate as will be obvious by considering Figure 1. The treadle supporting member is preferably formed from a flat bendable strip of metal and comprises a vertically extending loop 27 which overhangs the transverse shaft 24ª. The loop 27 terminates in a downwardly extending loop 28 and this loop 28 terminates in an upward extending portion 29 the terminal of which extends forwardly to provide a gate-engaging tongue 30. The loops 27 and 28 are firmly secured together by means of a retaining strap 31 firmly securing the loop 27 around the supporting shaft 24ª. The forwardly extending tongue 30 is braced by means of an angle bracing wire 32 which also engages the treadle supporting member 24 near the treadle plate 25.

From the foregoing description it will be seen that a very simple and efficient means has been provided for rockably supporting the treadle supporting member 24 upon the shaft 24ª, and that this treadle supporting member may be formed from one single strip of flat material providing an economical structure which may be very readily and conveniently assembled to accomplish the desired result.

The vertically sliding gate 18 is adapted to slide vertically within the vertical trackways 17 of the front panel 15 and this front panel is provided with an upwardly extending portion 33, which provides a guide and retainer for the gate 18 when it is in a vertically extended position.

The operation of the device is as follows:

The gate 18 is raised to the position shown in full lines in Figure 1, and the gate supporting tongue 30 is moved from the dotted line position to the full line position where this tongue 30 extends under the lower edge of the gate 18 and constitutes a support for the gate. A bait 34 is placed upon the inner end of the treadle plate 25 and the supporting cradles 22 are placed near the center of the trap so as to provide a passageway for the rodent upon either side of the supporting cradles 22. The rodent will enter through the opening 14 and pass to the rear of the trap and as soon as the rodent steps on the treadle plate 25 this treadle plate will move to the position shown in dotted lines, the treadle supporting members 24 rocking upon the supporting shaft 24ª and thus swing the gate supporting tongue 30 to the position shown in dotted lines from under the lower edge of the gate 18.

The parts are so positioned as to cause the gate 18 to be delicately balanced upon the extreme outer end of the tongue 30 and as the treadle plate 25 is swung downwardly the outer edge of the tongue 30 will be swung upwardly and inwardly of the trap away from the lower edge of the gate 18. The weight of the gate 18 will then cause the gate to automatically drop to a closed position over the opening 14 and in this way prevent the rodent from escaping through the opening 14.

It should be understood that certain detail changes in the device may be employed without departing from the spirit of the invention so long as such changes fall within the scope of the appended claims.

Having described the invention, what is claimed as new is:

1. A trap of the class described comprising a body, a vertically sliding gate carried by one end of the body, a treadle means comprising a supporting member formed from a sheet of material, a transverse shaft for supporting the supporting member, the supporting member comprising an upwardly extending loop and a downwardly extending loop, means for binding the loops together to hold the upwardly extending loop about the shaft, the downwardly extending loop terminating in an upwardly extending portion and carrying a gate engaging tongue, the gate engaging tongue being adapted to engage said gate for supporting the gate in an open position, and the treadle means being adapted to be tripped to swing the tongue out of engagement with the gate and to permit the gate to automatically drop to a closed position.

2. A trap of the class described comprising a body, a vertically sliding gate carried by one end of the body, a treadle means comprising a supporting member formed from a sheet of material, a transverse shaft for supporting the treadle member, the treadle member comprising an upwardly extending loop and a downwardly extending loop, means for binding the loops together to hold the upwardly extending loop about the shaft, the downwardly extending loop terminating in an upwardly extending portion and carrying a gate engaging tongue, the gate engaging tongue being adapted to fit under the bottom edge of said gate for supporting the gate in an open position, the treadle member being adapted to be tripped to swing the tongue out of engagement with the gate and to permit the gate to automatically drop to a closed position, cradle members supporting said shaft, a treadle plate carried by said treadle member, and a brace connected to the treadle member adjacent the treadle plate and engaging said gate engaging tongue for bracing said tongue.

CORNELIUS WARREN ADAMS.